(12) United States Patent
Kang

(10) Patent No.: US 8,854,584 B2
(45) Date of Patent: Oct. 7, 2014

(54) LIQUID CRYSTAL DISPLAY PANEL AND PIXEL ELECTRODE THEREOF

(75) Inventor: Chih-tsung Kang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 130 days.

(21) Appl. No.: 13/376,597

(22) PCT Filed: Oct. 20, 2011

(86) PCT No.: PCT/CN2011/081029
§ 371 (c)(1),
(2), (4) Date: Dec. 7, 2011

(87) PCT Pub. No.: WO2013/053144
PCT Pub. Date: Apr. 18, 2013

(65) Prior Publication Data
US 2013/0093987 A1    Apr. 18, 2013

(30) Foreign Application Priority Data

Oct. 12, 2011    (CN) .......................... 2011 1 0308397

(51) Int. Cl.
*G02F 1/1343* (2006.01)
*G02F 1/1337* (2006.01)
(52) U.S. Cl.
CPC .... *G02F 1/133707* (2013.01); *G02F 1/134309* (2013.01)
USPC ............................ 349/139; 349/129; 349/141
(58) Field of Classification Search
CPC ............................................... G02F 1/133707
USPC ....................................................... 349/141
See application file for complete search history.

(56) References Cited

U.S. PATENT DOCUMENTS

| 2006/0097255 | A1  | 5/2006 | Lai |
| 2007/0013850 | A1* | 1/2007 | Lin ............................ 349/129 |
| 2007/0216838 | A1* | 9/2007 | Hsu et al. ................... 349/129 |
| 2008/0204649 | A1* | 8/2008 | Yoshida et al. ............. 349/141 |
| 2010/0097535 | A1* | 4/2010 | Inoue et al. ................. 349/38 |
| 2010/0165259 | A1* | 7/2010 | Nakanishi et al. ........... 349/86 |

FOREIGN PATENT DOCUMENTS

| CN | 101089682 A | 12/2007 |
| CN | 101387803 A | 3/2009 |
| JP | 200897049 A | 4/2008 |
| TW | 200734731 A | 9/2007 |

OTHER PUBLICATIONS

International Search Report of the PCT Application No. PCT/CN2011/081029.

* cited by examiner

*Primary Examiner* — Bumsuk Won
*Assistant Examiner* — Edmond Lau

(57) ABSTRACT

A liquid crystal display (LCD) panel comprises scan lines, data lines and a plurality of switch units, and a pixel electrode disposed in a pixel region formed by the scan lines intersecting with the data lines. The pixel electrode comprises a peripheral portion, branch portions and an opening portion located inside the peripheral portion. The branch portions include a first branch portion having plurality of first branches parallel with each other and a second branch portion having a plurality of second branches parallel with each other. The opening portion comprises a first opening and a second opening perpendicularly connected with the first and second branches respectively. The first and second openings are located on midperpendiculars of the first branches and the second branches respectively. Extension lines of the first and second openings intersect with one scan line and one data lines to form a right triangle respectively.

17 Claims, 6 Drawing Sheets

LIQUID CRYSTAL DISPLAY PANEL AND PIXEL ELECTRODE THEREOF

BACKGROUND

1. Technical Field

The present disclosure relates to the technical field of liquid crystal displays (LCDs), and more particularly, to an LCD panel and a pixel electrode thereof.

2. Description of Related Art

Nowadays, LCDs have been widely used in various electronic devices such as mobile phones, personal digital assistants (PDAs), digital cameras, computer monitors and notebook computers. An LCD generally comprises a backlight module and an LCD panel. The LCD panel is comprised of two substrates and a liquid crystal layer filled therebetween. During the manufacturing process of the LCD panel, an alignment film is usually formed on each of the two substrates to align liquid crystal molecules into a specific orientation.

Currently, there is a technology for forming an alignment film which is called PSVA (polymer stabilization vertical-alignment) technology. According to the PSVA technology, a monomer compound is incorporated at an appropriate concentration into the liquid crystal material and then the liquid crystal mixture is shaken to a homogeneous state. Then, the liquid crystal mixture is heated by a heater until the liquid crystal mixture reaches an isotropic state. After the liquid crystal mixture cools down to the room temperature, it reverts to a nematic state. Afterwards, the liquid crystal mixture is filled into a cell and a voltage is applied. When the liquid crystal molecules become stably aligned under the action of the voltage applied, the monomer compound is polymerized through illumination of ultraviolet (UV) rays or through heating to form a polymer layer, thus achieving the purpose of stable alignment.

Usually, in a PSVA type LCD panel, an alignment slit is formed in each pixel electrode of the pixel structure to align the liquid crystal molecules into a specific orientation. Referring to FIG. 1, there is shown a schematic view of a portion of the PSVA type LCD panel corresponding to a pixel. As shown in FIG. 1, the LCD panel comprises a pixel region 1 and a pixel electrode 2 located in the pixel region 1. The pixel electrode 2 comprises a peripheral portion 21 and a plurality of branch portions 22 located inside the peripheral portion 21. A cruciform opening 23 is formed at a center of the branch portions 22 to form a central backbone of the pixel electrode 2 and divide the branch portions 22 into four regions. Each of the regions consists of branch portions 22 disposed flat and obliquely at an angle of 45°.

In the aforesaid pixel electrode structure, the orientations of the central backbone of the pixel electrode 2 are parallel with or perpendicular to the absorption axle of 0/90° VA polarizers. Therefore, when a voltage is applied to the pixel electrode 2, the cruciform central backbone presents a dark state in the pixel region 1, which decreases the transmission ratio of the backlight.

BRIEF SUMMARY

The primary objective of the present disclosure is to provide an LCD panel and a pixel electrode thereof, which can improve the displaying effect by increasing the aperture ratio of the LCD panel.

To achieve the aforesaid objective, the present disclosure provides a pixel electrode of an LCD panel. The LCD panel comprises a plurality of scan lines parallel with each other, a plurality of data lines parallel with each other and perpendicular to the scan lines, and a plurality of switch units. The switch units are electrically connected to the scan lines and the data lines respectively. Every two adjacent ones of the scan lines intersect with two adjacent ones of the data lines to form a pixel region, and the pixel electrode is disposed in the pixel region. The pixel electrode comprises:

a peripheral portion in a rectangular frame form, being electrically connected to the switch units;

branch portions located inside the rectangular frame of the peripheral portion, being electrically connected to the peripheral portion, wherein the branch portions include a first branch portion and a second branch portion, the first branch portion and the second branch portion are located in different regions inside the peripheral portion, the first branch portion comprises a plurality of first branches parallel with each other, and the second branch portion comprises a plurality of second branches parallel with each other; and an opening portion located inside the rectangular frame of the peripheral portion, wherein the opening portion comprises a first opening and a second opening, the first opening is perpendicularly connected with the first branches and is located on a midperpendicular of the first branches, the second opening is perpendicularly connected with the second branches and is located on a midperpendicular of the second branches, an extension line of the first opening intersects with one of the scan lines and one of the data lines to form a right triangle, and an extension line of the second opening intersects with one of the scan lines and one of the data lines to form a right triangle.

Preferably, the right triangle formed by the extension line of the first opening intersecting with one of the scan lines and one of the data lines is an isosceles right triangle.

Preferably, the right triangle formed by the extension line of the second opening intersecting with one of the scan lines and one of the data lines is an isosceles right triangle.

Preferably, the first opening and the second opening are perpendicular to each other.

Preferably, the branch portions further include a third branch portion and a fourth branch portion. The third branch portion comprises a plurality of third branches parallel with each other and corresponding to the first branches in one-to-one correspondence. The fourth branch portion comprises a plurality of fourth branches parallel with each other and corresponding to the second branches in one-to-one correspondence. The first branches connect with the first opening via the third branches, and the third branches are arranged obliquely with respect to the first opening. The second branches connect with the second opening via the fourth branches, and the fourth branches are arranged obliquely with respect to the second opening.

Preferably, the first branches include first left branches and first right branches that are symmetric with each other with respect to the first opening. The third branches include third left branches and third right branches that are symmetric with each other with respect to the first opening. The first left branches connect with the first opening via the third left branches, and the first right branches connect with the first opening via the third right branches. The second branches include second left branches and second right branches that are symmetric with each other with respect to the second opening. The fourth branches include fourth left branches and fourth right branches that are symmetric with each other with respect to the second opening. The second left branches connect with the second opening via the fourth left branches, and the second right branches connect with the second opening via the fourth right branches.

Preferably, the third left branches and the third right branches include angles of 45° with the first opening respectively; and the fourth left branches and the fourth right branches include angles of 45° with the second opening respectively.

Preferably, the third branches are arranged in parallel and equally spaced apart, and the fourth branches are arranged in parallel and equally spaced apart.

Preferably, each of the switch units is a thin-film transistor (TFT).

The present disclosure further provides an LCD panel comprises the pixel electrode as described above.

According to the LCD panel and the pixel electrode thereof of the present disclosure, the pixel electrode has a peripheral portion and branch portions. The branch portions include a first branch portion and a second branch portion, and have an opening portion disposed therein. The opening portion comprises a first opening and a second opening. The first opening is perpendicularly connected with the first branches, and the second opening is perpendicularly connected with the second branches. An extension line of the first opening intersects with one of the scan lines and one of the data lines to form a right triangle, and an extension line of the second opening intersects with one of the scan lines and one of the data lines to form a right triangle. The first opening and the second opening include a tilt angle with a polarizer in the LCD panel respectively so that the backbone regions where the first opening and the second opening are located present a bright state in the pixel region, thereby increasing the aperture ratio of the LCD panel. Furthermore, in the pixel electrode of the present disclosure, a third branch portion is disposed between the first opening and the first branches, a fourth branch portion is disposed between the second opening and the second branches, the third branch portion is arranged obliquely with respect to the first opening, and the fourth branch portion is arranged obliquely with respect to the second opening. With the aforesaid arrangement, the liquid crystal molecules can be aligned stably and continuously with the minimum elastic energy at the border between the backbone regions where the first opening and the second opening are located. This can reduce occurrences of unstable bright/dark nodes on the backbones and reduce the possibility of occurrences of residual images.

BRIEF DESCRIPTION OF THE DRAWINGS

FIG. 3 is a schematic view illustrating arrangement of liquid crystal molecules in the first embodiment of the LCD panel according to the present disclosure after a pixel electrode is powered on;

FIG. 5 is a schematic view illustrating arrangement of liquid crystal molecules in the second embodiment of the LCD panel according to the present disclosure after the pixel electrode is powered on.

Hereinafter, implementations, functional features and advantages of the present disclosure will be further described with reference to embodiments thereof and the attached drawings.

DETAILED DESCRIPTION

Hereinafter, the technical solutions of the present disclosure will be described in detail in conjunction with the attached drawings and embodiments thereof. It shall be understood that, the embodiments described herein are only intended to illustrate but not to limit the present disclosure.

Figure 1:
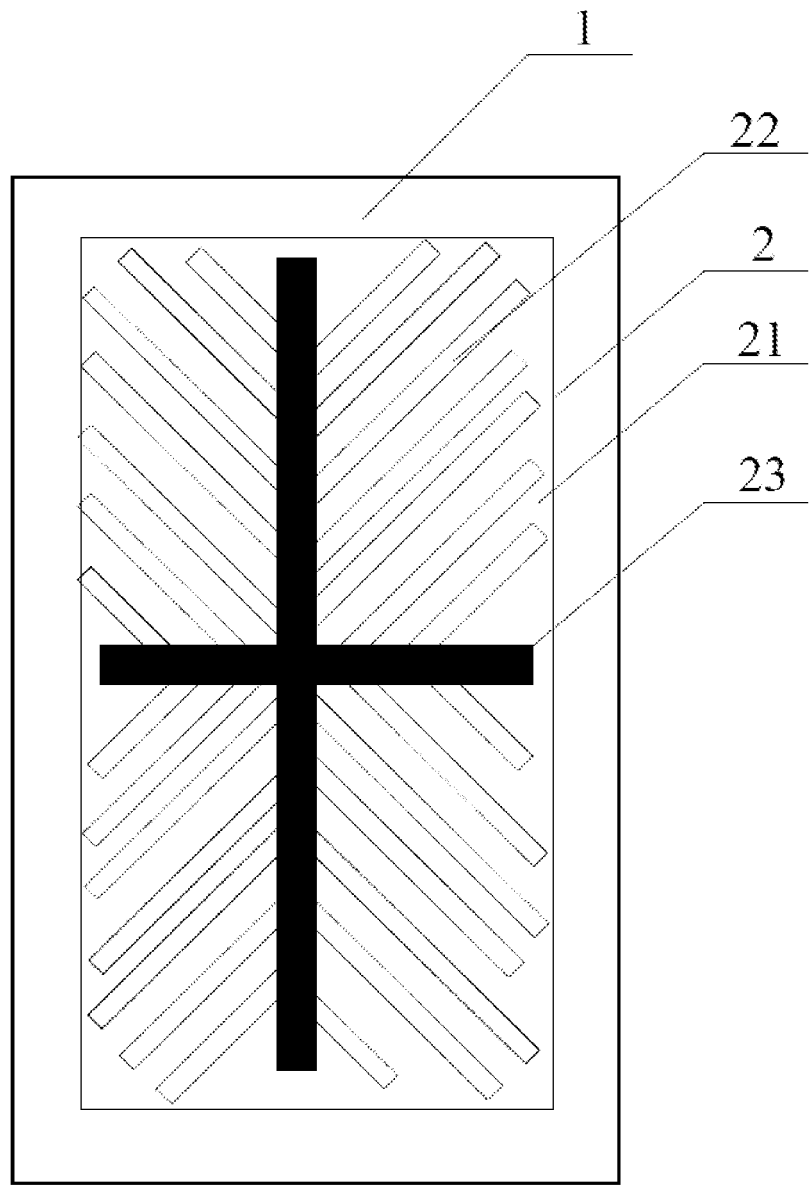
FIG. 1 is a schematic view of a portion of an PSVA type LCD panel corresponding to a pixel in the prior art.
Figure 2:
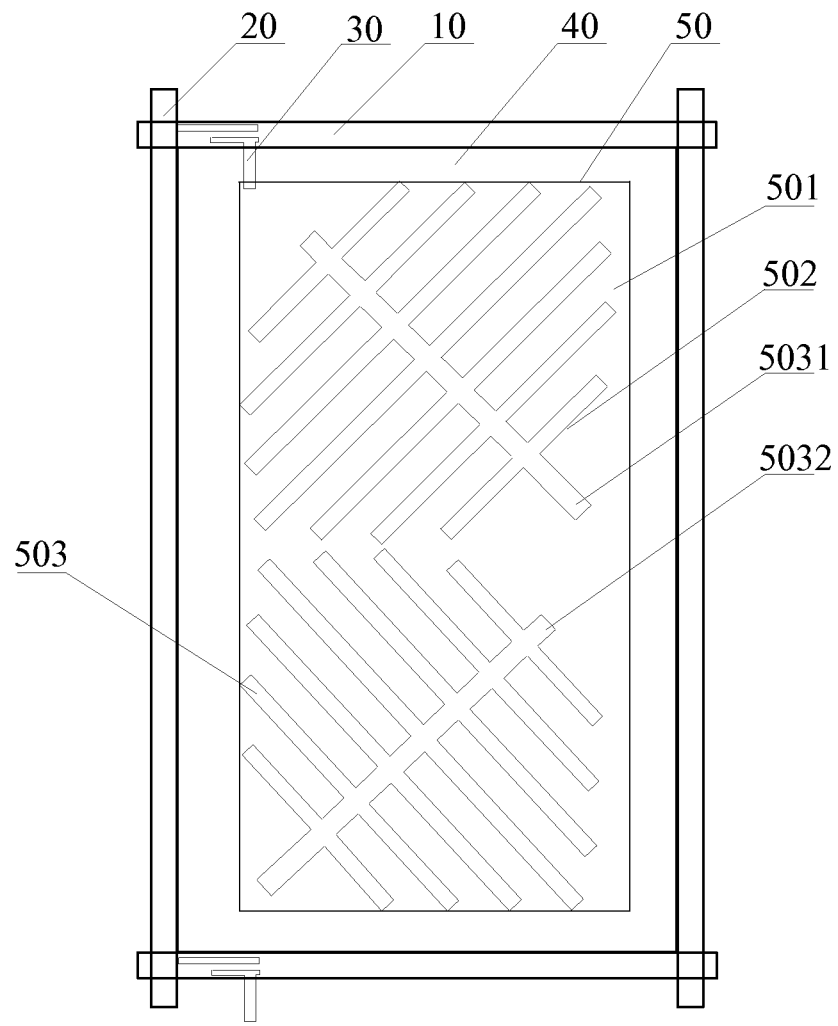
FIG. 2 is a schematic view illustrating a structure of a first embodiment of an LCD panel according to the present disclosure.

Referring to FIG. 2, there is shown a schematic view illustrating a structure of a first embodiment of an LCD panel according to the present disclosure. The LCD panel according to the first embodiment of the present disclosure comprises a plurality of scan lines 10 parallel with each other, a plurality of data lines 20 parallel with each other and perpendicular to the scan lines 10, and a plurality of switch units 30. The switch units 30 are electrically connected to the corresponding scan lines 10 and the corresponding data lines 20 respectively. Every two adjacent ones of the scan lines 10 intersect with two adjacent ones of the data lines 20 to form a pixel region 40, and a pixel electrode 50 is disposed in the pixel region 40.

In this embodiment, the pixel electrode 50 comprises a peripheral portion 501, branch portions and an opening portion. The peripheral portion 501 is in a rectangular frame form, and is electrically connected to the switch units 30. The branch portions are located inside the rectangular frame of the peripheral portion 501, and are electrically connected to the peripheral portion 501. The branch portions include a first branch portion and a second branch portion. The first branch portion and the second branch portion are located in different regions inside the rectangular frame of the peripheral portion 501 of the pixel electrode 50. The first branch portion comprises a plurality of first branches 502 parallel with each other, and the second branch portion comprises a plurality of second branches 503 parallel with each other. The opening portion is located inside the rectangular frame of the peripheral portion 501. The opening portion comprises a first opening 5031 and a second opening 5032. The first opening 5031 is perpendicularly connected with the first branches 502 and is located on a midperpendicular of the first branches 502. The second opening 5032 is perpendicularly connected with the second branches 503 and is located on a midperpendicular of the second branches 503. An extension line of the first opening 5031 intersects with one of the scan lines 10 and one of the data lines 20 to form a right triangle, and an extension line of the second opening 5032 intersects with one of the scan lines 10 and one of the data lines 20 to form a right triangle.

In an embodiment, the right triangle formed by the extension line of the first opening 5031 intersecting with one of the scan lines 10 and one of the data lines 20 may be an isosceles right triangle; and the right triangle formed by the extension line of the second opening 5032 intersecting with one of the scan lines 10 and one of the data lines 20 may be an isosceles right triangle.

Further, the first opening 5031 and the second opening 5032 are perpendicular to each other.

Figure 3:
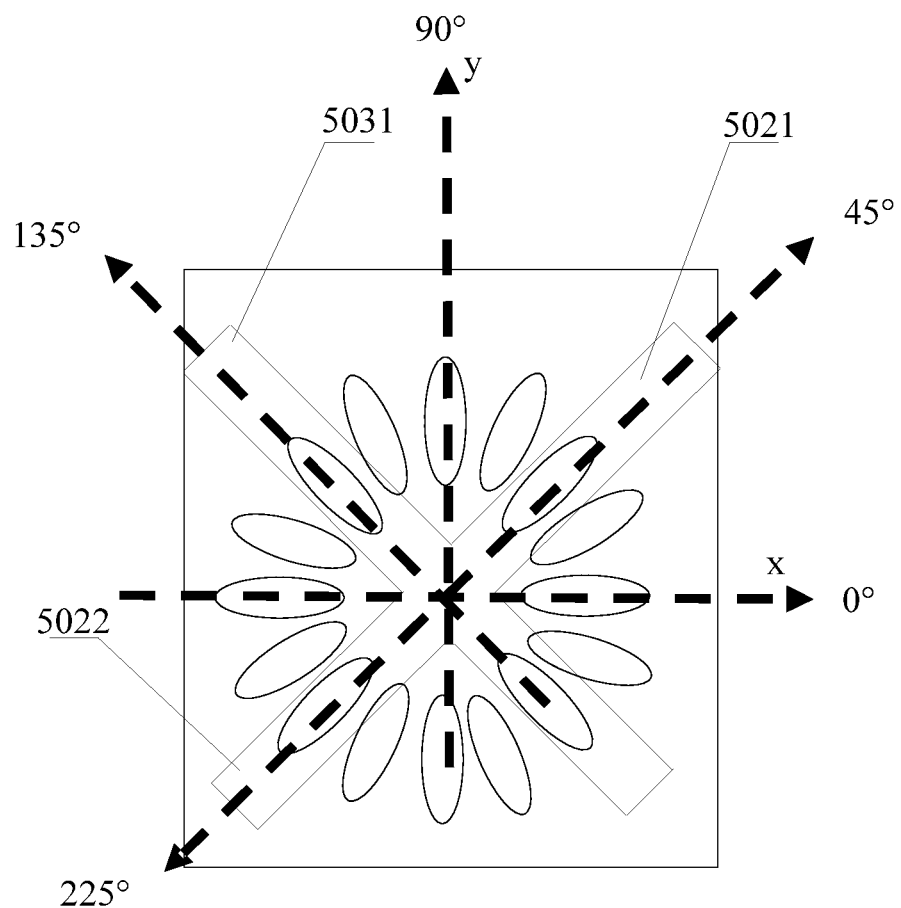

As shown in FIG. 3, there is shown a schematic view illustrating arrangement of liquid crystal molecules in the first embodiment of the LCD panel according to the present disclosure after the pixel electrode is powered on. Taking the first branch portion as an example, an axis parallel with the scan lines 10 is taken as the x-axis, an axis perpendicular to the scan lines 10 is taken as the y-axis, and the x-axis is taken as a reference axis at an angle of 0°, then the first opening 5031 has a tilt angle of 135° with respect to the x-axis in this embodiment. The first branches 502 include first left branches 5022 and first right branches 5021 that are symmetric with each other with respect to the first opening 5031. The first left branches 5022 and the first right branches 5021 disposed at two sides of the first opening 5031 are both perpendicular to the first opening 5031. The first right branches 5021 are located above the x-axis (i.e., at the right side of the first opening 5031) and have a tilt angle of 45° with respect to the x-axis. The first left branches 5022 are located below the x-axis (i.e., at the left side of the first opening 5031) and have a tilt angle of 225° with respect to the x-axis. As compared with the pixel electrode having a cruciform opening at a center of the branch portions in the prior art, the first opening 5031 and the second opening 5032 have a tilt angle of 45° with respect to the x-axis (i.e., with respect to the scan lines) in this embodiment of the LCD panel according to the present disclosure; i.e., the first opening 5031 and the second opening 5032 in this embodiment have an offset of 45° as compared with the cruciform opening at the center in the prior art.

Meanwhile, the first branches 502 around the first opening 5031 and the second branches 503 around the second opening 5032 include angles of 45° with the x-axis respectively. When the pixel electrode 50 is powered on, a tilt direction of the liquid crystal molecules includes an angle of 45° with a polarizer or an absorption axle because of the boundary electric field effect, so that both the regions of the first opening 5031 and the second opening 5032 present a bright state in the pixel region 1. This reduces the dark fringe area of the regions of the first opening 5031 and the second opening 5032 and increases the possibility for the liquid crystal molecules on the first opening 5031 and the second opening 5032 to tilt by 45° for improving the transmission ratio so as to increase the transmission ratio of the backlight, thereby increasing the aperture ratio of the LCD panel and improving the displaying effect of the LCD panel.

In this embodiment, each of the switch units 30 is a thin-film transistor (TFT). Each of the TFTs 30 comprises a source, a gate and a drain. The sources are connected with the data lines 20, the gates are connected with the scan lines 10, and the drains are connected with the pixel electrode 50.

Figure 4:
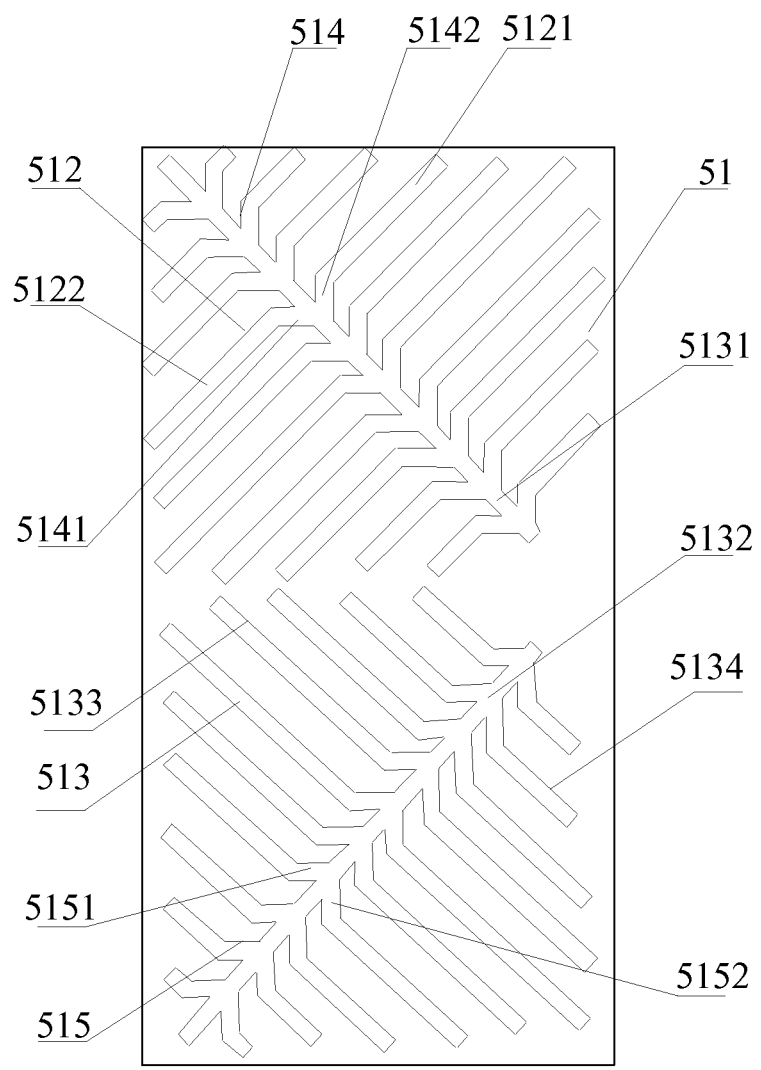
FIG. 4 is a schematic view illustrating a structure of a pixel electrode in a second embodiment of the LCD panel according to the present disclosure.

As shown in FIG. 4, there is shown a schematic view illustrating a structure of a pixel electrode in a second embodiment of the LCD panel according to the present disclosure. The LCD panel according to the second embodiment of the present disclosure is similar to that in the first embodiment. Specifically, branch portions of the pixel electrode 51 of this LCD panel include a first branch portion and a second branch portion; the first branch portion comprises a plurality of first branches 512 parallel with each other, which are symmetrically disposed at two sides of a first opening 5131; and the second branch portion comprises a plurality of second branches 513 parallel with each other, which are symmetrically disposed at two sides of a second opening 5132. Furthermore, the branch portions of the pixel electrode 51 in this embodiment further include a third branch portion and a fourth branch portion. The third branch portion is located between the first branch portion and the first opening 5131, and comprises a plurality of third branches 514 parallel with each other and corresponding to the first branches 512 in one-to-one correspondence. The fourth branch portion is located between the second branch portion and the second opening 5132, and comprises a plurality of fourth branches 515 parallel with each other and corresponding to the second branches 513 in one-to-one correspondence. The first branches 512 are perpendicular to the first opening 5131 and connect with the first opening 5131 via the third branches 514; and the third branches 514 are arranged obliquely with respect to the first opening 5131. The second branches 513 are perpendicular to the second opening 5132 and connect with the second opening 5132 via the fourth branches 515; and the fourth branches 515 are arranged obliquely with respect to the second opening 5132.

Specifically, the first branches 512 of the pixel electrode 51 include first left branches 5122 and first right branches 5121 that are symmetric with each other with respect to the first opening 5131; and the third branches 514 include third left branches 5141 and third right branches 5142 that are symmetric with each other with respect to the first opening 5131. The third left branches 5141 of the third branch portion are parallel with each other, and the third right branches 5142 are parallel with each other. The first left branches 5122 are perpendicular to the first opening 5131 and connect with the first opening 5131 via the third left branches 5141; and the first right branches 5121 are perpendicular to the first opening 5131 and connect with the first opening 5131 via the third right branches 5142. The second branches 513 include second left branches 5133 and second right branches 5134 that are symmetric with each other with respect to the second opening 5132. The fourth branches 515 include fourth left branches 5151 and fourth right branches 5152 that are symmetric with each other with respect to the second opening 5132. The fourth left branches 5151 of the fourth branch portion are parallel with each other, and the fourth right branches 5152 are parallel with each other. The second left branches 5133 are perpendicular to the second opening 5132 and connect with the second opening 5132 via the fourth left branches 5151; and the second right branches 5134 are perpendicular to the second opening 5132 and connect with the second opening 5132 via the fourth right branches 5152.

The third left branches 5141 and the third right branches 5142 include angles of 45° with the first opening 5131 respectively; and the fourth left branches 5151 and the fourth right branches 5152 include angles of 45° with the second opening 5132 respectively.

The third branches 514 are arranged in parallel and equally spaced apart, and the fourth branches 515 are arranged in parallel and equally spaced apart. As compared with the first embodiment, the aforesaid structure of this embodiment avoids unstable arrangement of the liquid crystal molecules with the minimum elastic energy at the border between the backbone regions where the first opening 5131 and the second opening 5132 are located. This can reduce occurrences of unstable bright/dark nodes on the backbones where the first opening 5131 and the second opening 5132 are located, and reduce the possibility of occurrences of residual images, thereby improving the displaying effect of the LCD panel.

Figure 5:
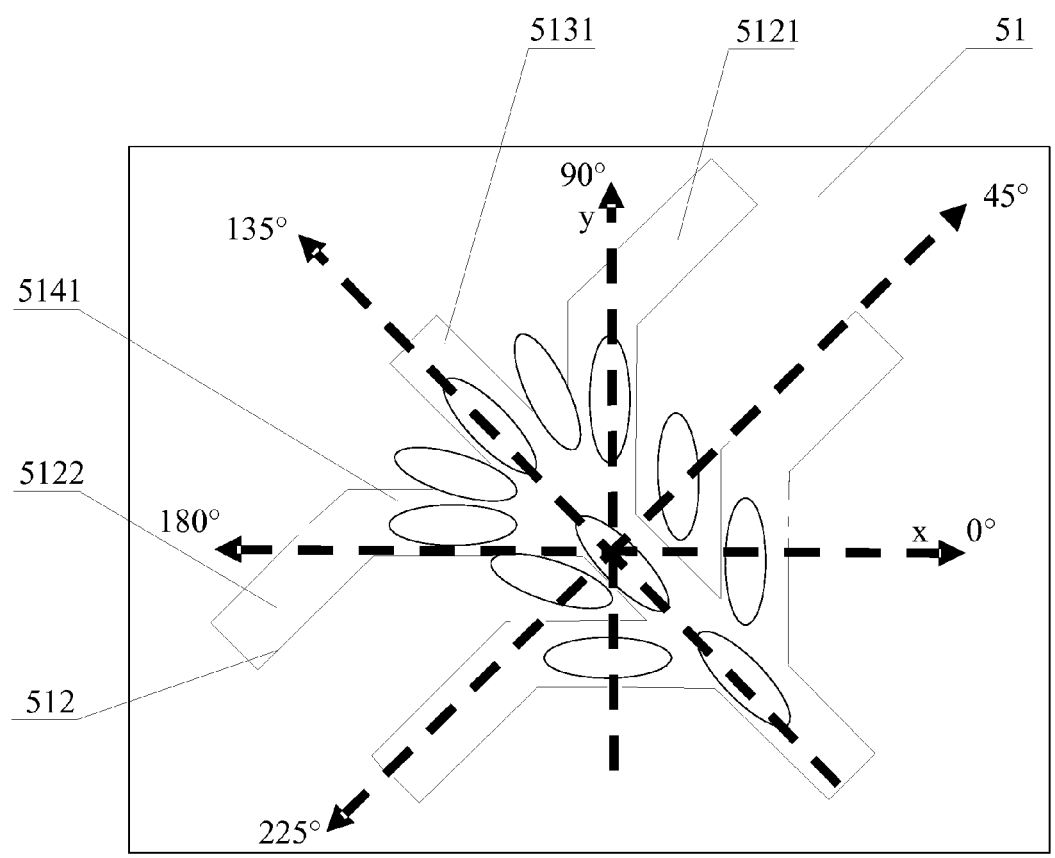

Specifically, referring to FIG. 3 and FIG. 5, FIG. 3 is a schematic view illustrating arrangement of the liquid crystal molecules in the first embodiment of the LCD panel according to the present disclosure after the pixel electrode is powered on; and FIG. 5 is a schematic view illustrating arrangement of the liquid crystal molecules in the second embodiment of the LCD panel according to the present disclosure after the pixel electrode is powered on.

As shown in FIG. 3, taking the first branch portion as an example, when the pixel electrode is powered on, the liquid crystal molecules (as shown by ellipses in FIG. 3) in the pixel electrode are arranged in the following way at the left side of the first opening 5031 under the action of the electric field: converging from the first left branches 5022 at angles of 225° at the left side of the first opening 5031 to the first opening 5031 at an angle of 135°. Meanwhile, the liquid crystal molecules are arranged in the following way at the right side of the first opening 5031: converging from the first right branches 5021 at angles of 45° at the right side of the first opening 5031 to the first opening 5031 at the angle of 135°. From the view point of the elastic energy, nodes tend to occur in arrangement of the liquid crystal molecules and positions thereof are not stable, which easily causes residual images during displaying images on the LCD.

As shown in FIG. 5, taking the first branch portion as an example, as compared with the first embodiment, this embodiment further has the third branch portion disposed between the first branches 512 of the pixel electrode 51 and the first opening 5131. The third branch portion comprises a plurality of the third branches, which include the third left branches 5141 and the third right branches 5142 that are symmetric with each other with respect to the first opening 5131. The third left branches 5141 and the third right branches 5142 include angles of 45° with the first opening 5131 respectively.

Specifically, taking the first branch portion as an example and the x-axis as a reference axis, the third left branches 5141 at angles of 180° are additionally provided between the first left branches 5122 at angles of 225° and the first opening 5131 at an angle of 135° in this embodiment, which allows the liquid crystal molecules (as shown by ellipses in FIG. 5) in the pixel electrode 51 to be aligned stably and continuously under the action of the electric field. That is, when the pixel electrode 51 is powered on, the liquid crystal molecules are arranged in the following way at the left side of the first opening 5131: converging from the first left branches 5122 at angles of 225° to an electrode position at an angle of 180° firstly and then converging from the electrode position at the angle of 180° to the first opening 5131 at an angle of 135°. Meanwhile, the liquid crystal molecules are arranged in the following way at the right side of the first opening 5131: converging from the first right branches 5121 at angles of 45° to an electrode position at an angle of 90° firstly and then converging from the electrode position at the angle of 90° to the first opening 5131 at the angle of 135°.

As compared with the first embodiment shown in FIG. 3, the electrode structure of this embodiment can avoid unstable arrangement of the liquid crystal molecules with the minimum elastic energy at the border between the backbone regions. This can reduce occurrences of unstable bright/dark nodes on the first opening 5131 and stabilize positions of the nodes each time a picture is switched so as to reduce the possibility of occurrences of residual images.

Hereinafter, taking the first branch portion as an example, the tilt angles of the branches with respect to the x-axis and how the liquid crystal molecules are arranged after the pixel electrode is powered on in this embodiment will be described in detail.

Figure 6:
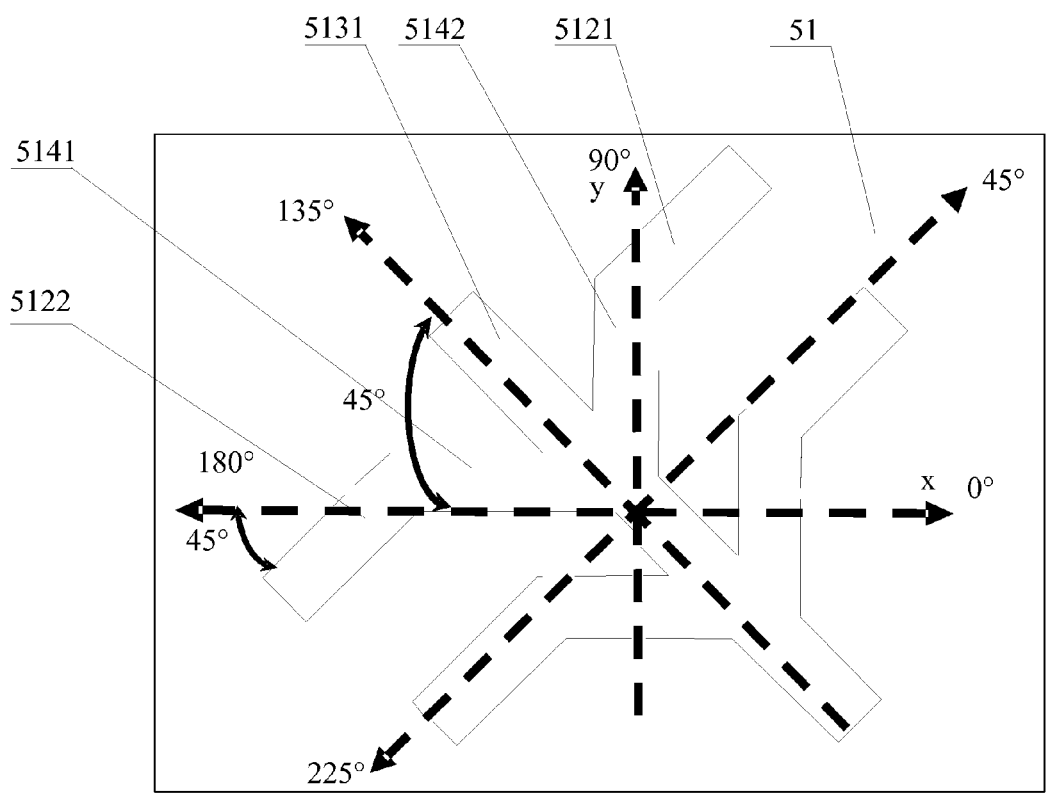
FIG. 6 is a schematic enlarged view illustrating a structure of a first opening portion, a first branch portion and a third branch portion of the pixel electrode shown in FIG. 4.

As shown in FIG. 6, there is shown a schematic enlarged view illustrating a structure of the first opening portion, the first branch portion and the third branch portion in the pixel electrode shown in FIG. 4.

Taking the x-axis as a reference axis, at the left side of the first opening 5131, the first left branches 5122 have tilt angles of 225°; the third left branches 5141 have tilt angles of 180° (i.e., are horizontal); and the first left branches 5122 and the third left branches 5141 include angles of 45° therebetween. The first opening 5131 has tilt angles of 135°; and the third left branches 5141 and the first opening 5131 include angles of 45° therebetween.

At the right side of the first opening 5131, the first right branches 5121 have tilt angles of 45°; the third right branches 5142 have tilt angles of 90° (i.e., are vertical); and the first right branches 5121 and the third right branches 5142 include angles of 45° therebetween. The third right branches 5142 and the first opening 5131 include an angle of 45° therebetween.

When the pixel electrode 51 is powered on, the liquid crystal molecules are arranged in the following way at the left side of the first opening 5131: converging from the first left branches 5122 at angles of 225° at the left side of the first opening 5131 to an electrode position at an angle of 180° of the third left branches 5141 at the left side of the first opening 5131 firstly, and then converging from the electrode position at the angle of 180° of the third left branches 5141 to the first opening 5131 at angles of 135°.

The liquid crystal molecules are arranged in the following way at the right side of the first opening 5131: converging from the first right branches 5121 at angles of 45° to an electrode position at an angle of 90° of the third right branches 5142 at the right side of the first opening 5131 firstly, and then converging from the electrode position at the angle of 90° of the third right branches 5142 to the first opening 5131 the angles of 135°.

The pixel electrode in the LCD panel of the aforesaid embodiments is the pixel electrode of the present disclosure, and thus will not be detailed herein.

According to the LCD panel and the pixel electrode thereof of the present disclosure, the pixel electrode has a peripheral portion and branch portions. The branch portions include a first branch portion and a second branch portion, and have an opening portion disposed therein. The opening portion comprises a first opening and a second opening. The first opening is perpendicularly connected with the first branches, and the second opening is perpendicularly connected with the second branches. An extension line of the first opening intersects with one of the scan lines and one of the data lines to form a right triangle, and an extension line of the second opening intersects with one of the scan lines and one of the data lines to form a right triangle. The first opening and the second opening include a tilt angle with a polarizer in the LCD panel respectively so that the backbone regions where the first opening and the second opening are located present a bright state in the pixel region, thereby increasing the aperture ratio of the LCD panel and improving the displaying effect of the LCD panel. Furthermore, in the pixel electrode of the present disclosure, a third branch portion is disposed between the first opening and the first branches, a fourth branch portion is disposed between the second opening and the second branches, the third branch portion is arranged obliquely with respect to the first opening, and the fourth branch portion is arranged obliquely with respect to the second opening. With the aforesaid arrangement, the liquid crystal molecules can be aligned stably and continuously with the minimum elastic energy at the border between the backbone regions where the first opening and the second opening are located. This can reduce occurrences of unstable bright/dark nodes on the backbones and reduce the possibility of occurrences of residual images.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A pixel electrode of a liquid crystal display (LCD) panel, the LCD panel comprising a substrate, a plurality of scan lines and a plurality of data lines formed on the substrate, and a plurality of switch units; the scan lines being parallel with each other, the data lines being parallel with each other and perpendicular to the scan lines, the switch units being electrically connected to the scan lines and the data lines respectively, every two adjacent ones of the scan lines intersecting with two adjacent ones of the data lines to form a pixel region on the substrate, and the pixel electrode being disposed in the pixel region and being located on the substrate, wherein the pixel electrode comprises:

a peripheral portion in a rectangular frame form, being formed on the substrate and electrically connected to the switch units;

branch portions located on the substrate and inside the rectangular frame of the peripheral portion, being electrically connected to the peripheral portion, wherein the branch portions include a first branch portion and a second branch portion, the first branch portion and the second branch portion are located in different regions inside the rectangular frame of the peripheral portion, the first branch portion comprises a plurality of first branches parallel with each other, and the second branch portion comprises a plurality of second branches parallel with each other; and an opening portion located on the substrate and inside the rectangular frame of the peripheral portion, wherein the opening portion comprises a first opening and a second opening, the first opening is perpendicularly connected with the first branches and is located on a midperpendicular of the first branches, the second opening is perpendicularly connected with the second branches and is located on a midperpendicular of the second branches, an extension line of the first opening intersects with one of the scan lines and one of the data lines to form a right triangle, and an extension line of the second opening intersects with one of the scan lines and one of the data lines to form a right triangle;

the branch portions further include a third branch portion and a fourth branch portion formed on the substrate, the third branch portion is integral with the first branch portion, and the fourth branch portion is integral with the second branch portion; the third branch portion comprises a plurality of third branches parallel with each other and corresponding to the first branches in one-to-one correspondence, the fourth branch portion comprises a plurality of fourth branches parallel with each other and corresponding to the second branches in one-to-one correspondence, the first branches connect with the first opening via the third branches, and the third branches are arranged obliquely with respect to the first opening; and the second branches connect with the second opening via the fourth branches, and the fourth branches are arranged obliquely with respect to the second opening.

2. The pixel electrode of claim 1, wherein the right triangle formed by the extension line of the first opening intersecting with one of the scan lines and one of the data lines is an isosceles right triangle.

3. The pixel electrode of claim 1, wherein the right triangle formed by the extension line of the second opening intersecting with one of the scan lines and one of the data lines is an isosceles right triangle.

4. The pixel electrode of claim 2, wherein the right triangle formed by the extension line of the second opening intersecting with one of the scan lines and one of the data lines is an isosceles right triangle.

5. The pixel electrode of claim 1, wherein the first opening and the second opening are perpendicular to each other.

6. The pixel electrode of claim 1, wherein the first branches include first left branches and first right branches that are symmetric with each other with respect to the first opening, the third branches include third left branches and third right branches that are symmetric with each other with respect to the first opening, the first left branches connect with the first opening via the third left branches, and the first right branches connect with the first opening via the third right branches; and the second branches include second left branches and second right branches that are symmetric with each other with respect to the second opening, the fourth branches include fourth left branches and fourth right branches that are symmetric with each other with respect to the second opening, the second left branches connect with the second opening via the fourth left branches, and the second right branches connect with the second opening via the fourth right branches.

7. The pixel electrode of claim 6, wherein the third left branches and the third 10 right branches include angles of 45° with the first opening respectively, and the fourth left branches and the fourth right branches include angles of 45° with the second opening respectively.

8. The pixel electrode of claim 1, wherein the third branches are arranged in parallel and equally spaced apart, and the fourth branches are arranged in parallel and equally spaced apart.

9. The pixel electrode of claim 1, wherein each of the switch units is a thin-film transistor (TFT).

10. An LCD panel, comprising a substrate, a plurality of scan lines and a plurality of data lines formed on the substrate, and a plurality of switch units; the scan lines being parallel with each other, the data lines being parallel with each other and perpendicular to the scan lines; wherein the switch units are electrically connected to the scan lines and the data lines respectively, every two adjacent ones of the scan lines intersect with two adjacent ones of the data lines to form a pixel region on the substrate, and a pixel electrode is disposed in the pixel region and is located on the substrate, wherein the pixel electrode comprises:

a peripheral portion in a rectangular frame form, being formed on the substrate and electrically connected to the switch units;

branch portions located on the substrate and inside the rectangular frame of the peripheral portion, being electrically connected to the peripheral portion, wherein the branch portions include a first branch portion and a second branch portion, the first branch portion and the second branch portion are located in different regions inside the rectangular frame of the peripheral portion, the first branch portion comprises a plurality of first branches parallel with each other, and the second branch portion comprises a plurality of second branches parallel with each other; and an opening portion located on the substrate and inside the rectangular frame of the peripheral portion, wherein the opening portion comprises a first opening and a second opening, the first opening is perpendicularly connected with the first branches and is located on a midperpendicular of the first branches, the second opening is perpendicularly connected with the second branches and is located on a midperpendicular of the second branches, an extension line of the first opening intersects with one of the scan lines and one of the data lines to form a right triangle, and an extension line of the second opening intersects with one of the scan lines and one of the data lines to form a right triangle;

the branch portions further include a third branch portion and a fourth branch portion formed on the substrate, the third branch portion is integral with the first branch portion, and the fourth branch portion is integral with the second branch portion; the third branch portion comprises a plurality of third branches parallel with each other and corresponding to the first branches in one-to-one correspondence, the fourth branch portion comprises a plurality of fourth branches parallel with each other and corresponding to the second branches in one-to-one correspondence, the first branches connect with the first opening via the third branches, and the third branches are arranged obliquely with respect to the first opening; and the second branches connect with the second opening via the fourth branches, and the fourth branches are arranged obliquely with respect to the second opening.

11. The LCD panel of claim 10, wherein the right triangle formed by the extension line of the first opening intersecting with one of the scan lines and one of the data lines is an isosceles right triangle.

12. The LCD panel of claim 10, wherein the right triangle formed by the extension line of the second opening intersecting with one of the scan lines and one of the data lines is an isosceles right triangle.

13. The LCD panel of claim 10, wherein the first opening and the second opening are perpendicular to each other.

14. The LCD panel of claim 10, wherein the first branches include first left branches and first right branches that are symmetric with each other with respect to the first opening, the third branches include third left branches and third right branches that are symmetric with each other with respect to the first opening, the first left branches connect with the first opening via the third left branches, and the first right branches connect with the first opening via the third right branches; and the second branches include second left branches and second right branches that are symmetric with each other with respect to the second opening, the fourth branches include fourth left branches and fourth right branches that are symmetric with each other with respect to the second opening, the second left branches connect with the second opening via the fourth left branches, and the second right branches connect with the second 20 opening via the fourth right branches.

15. The LCD panel of claim 14, wherein the third left branches and the third right branches include angles of 45° with the first opening respectively, and the fourth left branches and the fourth right branches include angles of 45° with the second opening respectively.

16. The LCD panel of claim 10, wherein the third branches are arranged in parallel and equally spaced apart, and the fourth branches are arranged in parallel and equally spaced apart.

17. The LCD panel of claim 10, wherein each of the switch units is a TFT.

\* \* \* \* \*